March 8, 1938.  G. HOGG ET AL  2,110,832
WELDING TOOL
Filed June 22, 1934  2 Sheets-Sheet 2

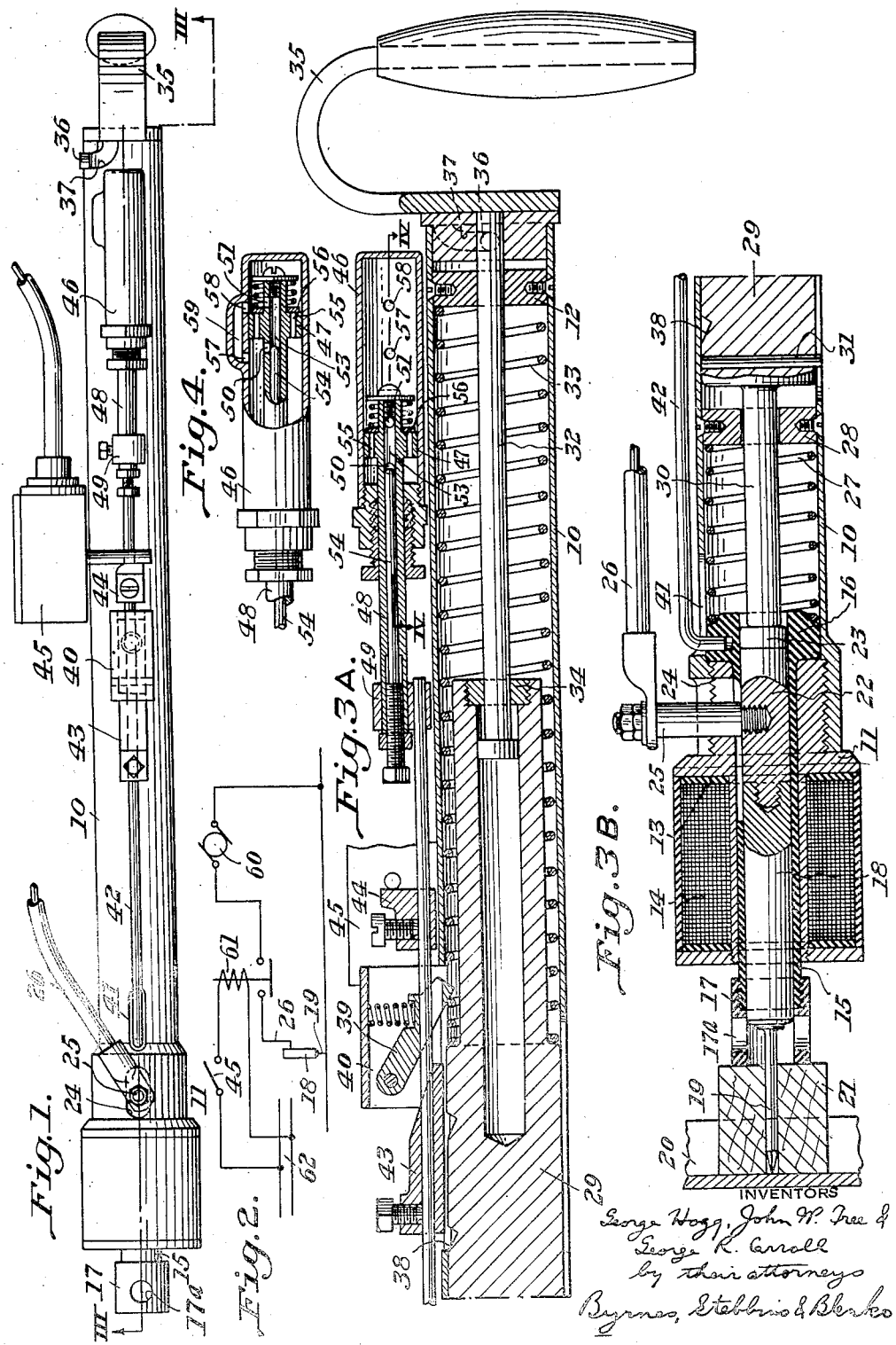
March 8, 1938.  G. HOGG ET AL  2,110,832
WELDING TOOL
Filed June 22, 1934  2 Sheets-Sheet 1

INVENTORS
George Hogg, John W. Free &
George R. Carroll
by their attorneys
Byrnes, Stebbins & Blenko Patented Mar. 8, 1938

2,110,832

UNITED STATES PATENT OFFICE 2,110,832

WELDING TOOL

George Hogg, Forest Hills, and John W. Free and George R. Carroll, Aliquippa, Pa., assignors to Jones & Laughlin Steel Corporation, Pittsburgh, Pa., a corporation of Pennsylvania Application June 22, 1934, Serial No. 731,912

22 Claims. (Cl. 219—4)

Our invention relates to a welding tool, and in particular, to a tool for carrying out the method disclosed and claimed in Patent No. 2,096,495, granted to George Hogg on October 19, 1937, for Method of construction.

In the aforementioned co-pending application, there is disclosed and claimed a method of securing members such as structural elements to a metallic frame or support by welding to the latter a fastening member extending through the element to be attached to the frame or support. The advantages of such method are obvious and it is the object of our invention to provide a device whereby the method can be carried out quickly and cheaply without requiring particularly skilled operatives.

In accordance with our invention, we provide a tool which is adapted to receive a fastening member such as a nail and, after striking an arc between the fastening member and the supporting frame, forcing the nail toward the support as it is fused and finally effecting a weld therebetween. As pointed out in the co-pending application, uniform movement of the fastening member toward the support during the fusing period of the weld is important. Our invention therefore includes means for insuring such uniform movement.

Means are also provided for causing a rapid movement of the nail toward the work at the conclusion of the operation and the delivery of a final forging blow to complete the weld. The invention also contemplates means for automatically cutting off the welding current at the completion of the weld.

For a complete understanding of the invention, reference is made to the accompanying drawings illustrating the present preferred embodiment. In the drawings—

Figure 1 is a plan view of the tool;

Figure 2 is a schematic diagram of certain connections extending from the tool;

Figure 5:
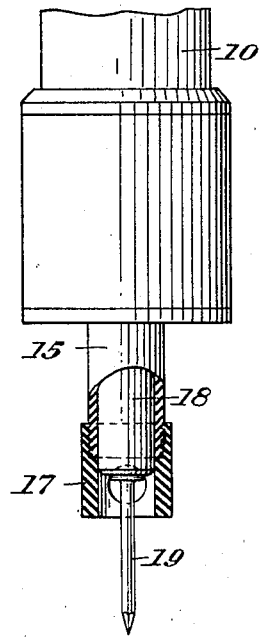
Figure 6:
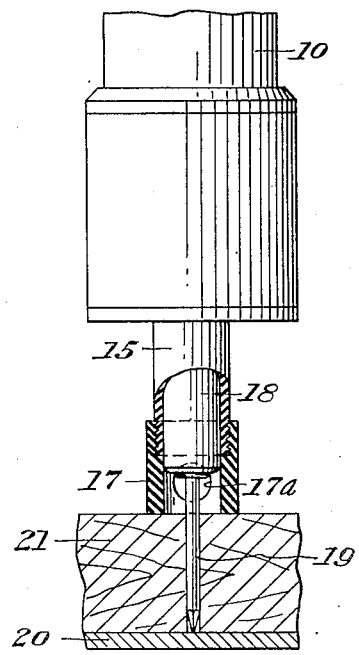
Figure 7:
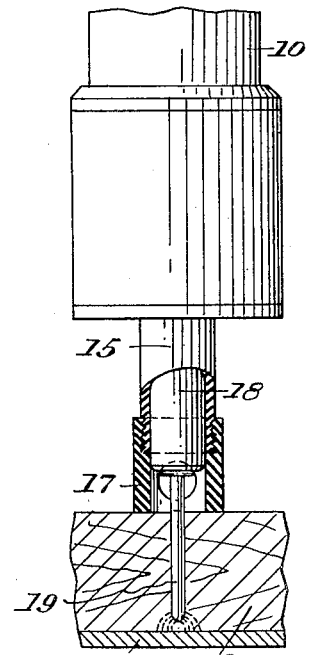
Figure 8:
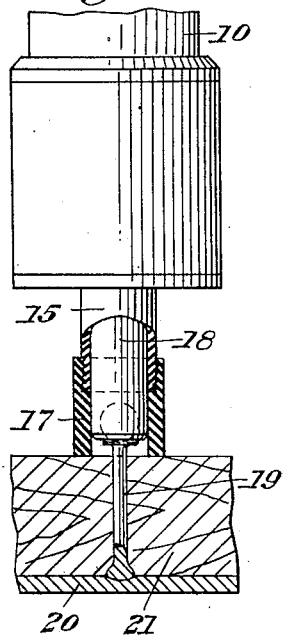
Figure 9:
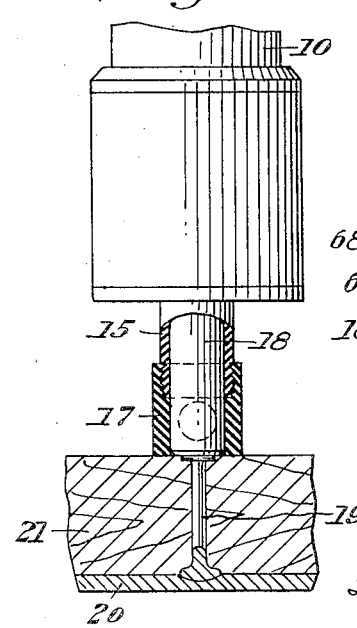

Figures 3a and 3b together constitute a longitudinal sectional view to enlarged scale on the line III—III of Figure 1;

Figure 4 is a partial sectional view along the line IV—IV of Figure 3a;

Figure 5 shows the tool with a fastening nail held thereto by magnetic attraction;

Figure 6 shows the insertion of the nail through the hole in the member to be fastened until it engages the supporting or frame member;

Figure 7 shows the first stage of the welding operation after the fusing of the nail point;

Figure 8 shows a later stage in the welding operation;

Figure 9 shows the completion of the weld; and

Figure 10:
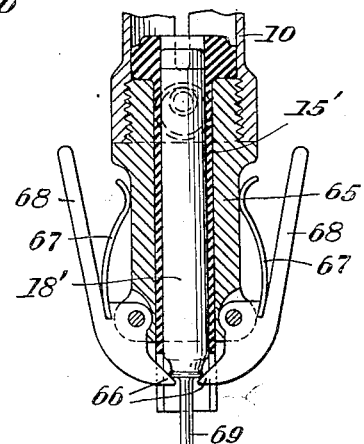

Figure 10 is a partial sectional view similar to Figure 3b, showing a modified construction.

Referring now in detail to the drawings, the tool comprises a barrel 10 having a head 11 of brass or other non-magnetic material threaded into one end and a plug 12 closing the other end. The head 11 has a spool portion 13 for receiving a magnet coil 14. A sleeve 15 of insulating material is reciprocable axially of the head 11 and has an enlargement 16 at one end thereof. The sleeve 15 extends outwardly of the spool 13 and has a removable nipple 17 of insulating material threaded thereon. The nipple 17 has radial ports 17a therein.

A plunger 18 is reciprocable in the sleeve 15 and is of magnetic material to serve as a core for the coil 14. When the plunger 18 is magnetized by energization of the coil 14, it is effective to hold a nail 19 or other fastening means of magnetic material to the plunger prior to the formation of a weld between the end of the nail and a metallic supporting member such as an angle 20 for a member to be attached thereto such as a furring strip 21.

An extension plug 22 preferably of non-magnetic material is secured to the plunger 18 and a head 23 of steel is attached to the plug 22. A radial bore 24 is formed in the head 11 to receive a terminal post 25 threaded into the plug 22. A welding current supply conductor 26 is connected to the post 25. The sleeve 15 and its enlargement 16 are normally forced outwardly of the barrel 10 by a spring 27 bearing on the enlargement 16 and on a plug 28 secured in the barrel at a point spaced inwardly from the end thereof.

A hammer 29 is reciprocable in the barrel 10 and has a projection 30 extending through the plug 28 for engagement with the head 23 on the plug 22 to deliver a blow to the plunger 18. A pin 31 extending transversely of the hammer slides in a slot in the barrel to prevent rotation of the hammer relative thereto. The rear end of the hammer is bored out to receive an enlarged head formed at the end of a pull rod 32. A spring 33 normally forces the hammer 29 to the illustrated position, but it may be retracted, however, by the pull rod 32. When the latter is withdrawn, its head engages a plug 34 threaded in the bore in the hammer 29. A handle 35 is attached to the end of the rod 32 for convenience in setting the hammer. A pin 36 on the handle 35 and a slot 37 in the end of the barrel permit the handle to be locked in its inner position.

The hammer 29 is notched at intervals as at 38. These notches are adapted to cooperate with a detent 39 pivoted in a bearing 40 attached to the barrel 10. When the hammer 29 has been withdrawn by pulling on the handle 35 until the detent 39 engages one of the notches 38, the hammer is held in retracted position until tripped, as will be described later, and the handle may be thrust home and locked.

The barrel 10 is slotted at 41 and a push rod 42 extending along the barrel 10 has one end bent over to enter the slot 41 and a radial bore in the enlargement 16 of the sleeve 15. A tripper 43 is adjustably secured to the push rod 42 for engaging the detent 39 after a predetermined movement of the barrel 10 relative to the sleeve 15. The push rod 42 also carries a tripper 44 for operating a control switch 45 secured to the barrel 10.

A fluid check cylinder 46 is secured to the handle end of the barrel 10 and is provided with a piston 47 having a rod 48 extending outwardly thereof and connected to the end of the push rod 42 by a clamp 49. Transverse bores 50 and 51 through the piston rod 48 on opposite sides of the piston 47 communicate with an axial bore 53 therethrough. A stem 54 is adjustable in the bore 53 for partially closing the inner section between the bore 50 and the bore 53. Axial bores 55 through the piston 47, together with a spring pressed valve disk 56, constitute a check valve for the piston. Ports 57 and 58 in the wall of the cylinder 46 are in communication through a by-passing passage 59.

Before describing the operation of the invention, it will be desirable to refer briefly to Figure 2. As there shown, a generator 60 or other convenient source of welding current has one terminal grounded on the frame or support exemplified by the angle 20, to which the fastening member or nail 19 is to be welded. The other terminal of the generator is adapted to be connected to the conductor 26 which is in contact with the plunger 18, by the operation of a contactor 61 controlled by the switch 45. The control circuit including the switch 45 and the operating coil of the contactor 61 may be connected to any convenient supply source indicated at 62. It will be obvious that when the switch 45 is closed, the contactor 61 will operate to connect the plunger 18 to the generator so that as soon as a nail or other fastener carried by the plunger 18 makes contact with the frame member 20, welding current will flow with results to be described hereafter.

The members to be secured to the metal frame or supports are preferably bored to receive the nails or other fastening members. While we have taken as an example, the attachment of a wood furring strip 21 to an angle 20, it will be apparent that the invention may be used for the attachment of members of almost any character to a metal frame or support. Examples of such materials of other characters are pre-cast concrete or gypsum planks, or any other composition of non-conducting character. Instead of having the holes for the nails or fastening members bored in advance, it is possible to drive the nails in the case of wood members. In the preferred use of the invention, however, the holes in the member to be attached will be bored first and a nail applied to the end of the plunger 18 to be held thereon by the magnetization effected by the coil 14. The hammer 29 is then set or cocked and the switch 45 closed. The nail is then inserted in the hole, although the reverse procedure may be followed, namely, the insertion of the nail and then the placing of the end of the plunger 18 on the nail head. The length of nail used will generally be in proportion to the thickness of the member being attached, so that a sufficient length of the latter projects to provide material for the weld.

The switch 45 having been closed, forward movement of the tool causes the nipple 17 to engage the strip 21. The spring 27 is compressed, and the engagement of the plunger with the nail and the nail with the frame member 20 completes the welding circuit whereupon current begins to flow therethrough.

The initial result of the flow of welding current is the fusion of the point of the nail 19. This leaves a slight gap between the end of the nail and the angle 20, and an arc is sprung across this gap. After contact has been made, the operator continues to push on the handle 35. The nipple 17 prevents movement of the sleeve 15 and the push rod 42. The rest of the tool, however, including the cylinder 46, moves toward the work as pressure is applied. The plunger 18 is retracted until the post 25 engages the side of the bore 24. Because of the restricted opening between the bore 50 and the bore 53 in the piston rod 48, fluid in the check cylinder 46 flows slowly from one side of the piston to the other. The rate of movement of the barrel 10 of the tool toward the work is thus substantially uniform.

The stem 54 is adjusted so that the rate of travel of the barrel will be such as to maintain a substantially constant arc gap between the fused end of the nail 19 and the work 20. During the maintenance of the arc, of course, a fused spot forms on the support member opposite the fused end of the nail. By the time this spot has been properly fused, the piston 47 in the cylinder 46 opens the port 57 so that the fluid remaining behind the piston is quickly released, with the result that the entire tool moves forward without the restraining effect of the fluid check.

This accelerated movement of the tool is communicated to the plunger 18 and the nail 19 to bring the fused end of the nail and the fused spot on the support together. By this time, the tripper 43 has lifted the detent 39 out of its notch 38 in the hammer 29, and the latter, being released, delivers a forging blow through the projection 30 to the plunger 18, completing the weld between the nail and the frame member 20 and establishing a permanent connection therebetween. At the same time, the tripper 44 opens the switch 45. The contactor 61 thereupon opens to cut off the welding current. Any gases generated during the continuance of the arc are permitted to escape through the port 17a.

After the completion of one operation, the hammer is re-set, the switch 45 closed and the tool is then ready for the next operation as has already been described.

From the foregoing description of the operation of the invention, it will be apparent that a method of welding including several stages is performed thereby. These stages are shown in Figures 5 through 9. Figure 9 illustrates the application of the nail 19 to the plunger 18 which is magnetized by the coil 14. As previously explained, of course, the nail may be inserted in the work first and the plunger guided onto the nail. In either case, the second state of the operation, shown in Figure 7, positions the nail 19 with its point on the frame member 20.

Assuming that the welding circuit has been completed by the closing of the control switch, welding current starts to flow as soon as the nail point engages the angle 20. Because of the small cross section of the nail point, fusion takes place almost immediately. This creates an arc gap between the nail 19 and the frame member 20 as shown in Figure 7. The maintenance of the arc fuses the nail back further and further from its point and also develops a fused spot in the member 20 opposite the nail. The nail is fed downwardly as fusion continues. When a sufficient portion of the nail length has been fused off, the arc gap is closed as shown in Figure 8, by forcing the nail down so that its fused end engages the fused spot on the member 20.

Under these conditions, the delivery of a sharp blow to the nail head by the tripping of the hammer sets the nail with the top of its head flush with the surface of the strip 21, and at the same time drives the fused end of the nail against the fused spot of the angle 20 with sufficient force to effect a sound, tight weld.

Figure 10 shows a mechanical chuck or holder which may be substituted for the magnet 14 when non-ferrous nails are used. The chuck comprises a sleeve 65 threaded onto the end of the barrel 10, for reciprocably receiving the sleeve 15' and the plunger 18'. Jaws 66 are pivoted on the end of the sleeve 65 and are urged to closed position by springs 67. The springs engage rearward extensions 68 on the jaws 66, by which the latter may be retracted for the insertion of a fastener such as the nail shown at 69. The jaws serve in an obvious way to hold the nail in contact with the end of the plunger 18' preparatory to welding in the manner already described. The sleeve 15' is slotted at its end to permit entry of the jaws 66.

It has been found that a tool of the character described makes it possible to fasten nails to steel frame members at the rate of about 100 per hour over considerable periods without any difficulty. The welds furthermore, are uniformly sound and strong. It has been found that the head of the nail will generally fail under tension before the weld between the shank of the nail and the frame member. The device disclosed herein is simple and inexpensive in construction, and reliable in operation. No particular skill is required to use it and, as stated, it is capable of very rapid operation. The automatic tripping of the hammer and the cutting off of the welding current make it possible for the operator to confine his attention solely to the problem of guiding the tool toward the nail and exerting the necessary pressure on the former. The fluid check assures a uniform rate of movement of the nail toward the work as its end fuses. This establishes a very satisfactory welding arc which effects a permanent union when the weld is completed.

It will be obvious that our invention is not limited to steel nails, since nails of other material such as copper, may be welded just as readily to supporting frame members of steel or other metal which is capable of effecting a weld therewith.

We have found that there is some difficulty when using this device in fastening gypsum plank to steel frame members for two reasons, viz: (1) the gypsum dust left in the hole after drilling covers up the steel at the bottom of the hole making electrical contact difficult; and (2) this gypsum dust unites with the molten metal at the weld and tends to produce a weak joint.

Both these difficulties have been overcome by dropping salt water in the hole which does two things, viz: (1) it converts the dry gypsum dust which is a non-conductor of electric current into a wet paste which is enough of an electrical conductor to serve our purpose; and (2) the salt apparently counteracts the weakening effect of the gypsum mentioned above and results in a strong weld.

It was also discovered that copper-plating the nails obtained a similar result in eliminating the weakening effect caused by the gypsum dust. The copper plating, however, does not correct the "non-conductor" effect of the gypsum dust. Solutions other than salt water may be used, of course, instead of the latter, the essential requirement apparently being that they are electrolytes, or form conducting pastes with the gypsum dust.

Although we have illustrated and described but one preferred embodiment of the invention, it will be apparent that numerous changes therein may be made without departing from the spirit of the invention or the scope of the appended claims.

We claim:

1. In a welding tool, a barrel adapted to be gripped and supported manually, a fastener engaging means disposed in said barrel, means carried by the barrel for telescopic movement relative thereto, and fluid means on the barrel tending to cause movement of the fastener engaging means at a uniform rate on the application of thrust to said barrel and engagement of said second-mentioned means with a member being fastened.

2. In a fastener welding device, the combination with fastener engaging means, a work-engaging means, means adapted to be gripped manually for applying thrust to said fastener engaging means, and a yielding connection between said work-engaging means and said thrust-applying means whereby on application of thrust to said last-mentioned means a substantially uniform motion is imparted to said first-mentioned means.

3. In a fastener welding tool, a barrel, a head at one end of said barrel, a plunger reciprocable in said head adapted to engage a fastener, a sleeve reciprocable in said head surrounding said plunger, a push rod connected to said sleeve and extending along said barrel, and a fluid check carried by said barrel for limiting movement of the push rod relative thereto.

4. The apparatus defined by claim 3 characterized by a by-passing passage in said fluid check for releasing the pressure therein after a predetermined movement of the barrel relative to said sleeve.

5. The apparatus defined by claim 3 characterized by a hammer reciprocable in said barrel adapted to deliver a blow to said plunger.

6. The apparatus defined by claim 3 characterized by a hammer reciprocable in the barrel, means for cocking the hammer including a trigger, and means for springing the trigger on predetermined relative movement between the barrel and the fastener engaging means.

7. A welding tool comprising a barrel adapted to be gripped and supported manually, a plunger reciprocable axially thereof for engagement with a fastener to be welded, means retractible on advancement of the barrel and plunger, and a fluid check on said barrel connected to said means, for limiting the speed of advancement of the barrel and plunger.

8. A welding tool comprising a barrel adapted to be gripped and supported manually, a plunger reciprocable axially thereof for engagement with a fastener to be welded, a switch on said barrel controlling the welding current, and means retractible on advancement of the barrel and plunger for operating the switch on predetermined axial movement relative thereto.

9. A welding tool comprising a barrel adapted to be gripped and supported manually, a plunger reciprocable axially thereof for engagement with a fastener to be welded, means retractible on advancement of the barrel, electric-current supply means connected to said plunger, and a hammer reciprocable in said barrel and adapted to deliver a blow to said plunger when released by said retractible means.

10. The apparatus of claim 9 characterized by a spring for actuating the hammer, a trigger for releasing the hammer, and means operated by relative movement of the barrel and said retractible means for springing the trigger.

11. The apparatus of claim 7 wherein said fluid check comprises two elements, viz., a piston and a cylinder carried on said barrel, one of said elements being rigidly connected to the barrel and the other being movable relative thereto, and rigidly connected to said retractible means.

12. The apparatus of claim 7 wherein said retractible means comprises a tubular member surrounding said plunger and adapted to engage a piece through which a fastener is to be welded to another piece, said tubular member being reciprocable in said barrel.

13. A portable hand tool for welding fasteners to metal members comprising a body, a fastener-engaging member carried by said body, a welding-current supply connection on said member, and a hammer reciprocable longitudinally of said body for delivering a blow to said member to set a fastener after it has been heated sufficiently to weld.

14. A portable hand tool for welding fasteners to a metallic support comprising a body, means movably mounted thereon to engage a member being fastened, means for engaging a fastener, means for supplying current to said fastener-engaging means, and means for limiting the speed of movement of the body toward the work on application of force longitudinally of the body, to permit heating and progressive fusion of the fastener.

15. The apparatus defined by claim 14 characterized by said speed-limiting means being effective only throughout a portion of the movement of the body, whereby to permit accelerated movement thereof to weld the fastener to said support.

16. Apparatus for welding to a support fasteners extending through a member to be secured to said support comprising a body, means reciprocable thereof to engage said member, a fastener-engaging means carried by said body, and means for limiting the movement of the body toward said member-engaging means to a slow uniform speed during heating and fusion of said fastener and a portion of said support.

17. The apparatus defined by claim 16 characterized by said limiting means being effective for only an initial portion of the movement of the body, after which the body is accelerated to thrust the fastener home against the support.

18. Apparatus for welding to a support fasteners extending through a member to be secured to said support comprising a body, means reciprocable thereof to engage said member, a fastener-engaging means carried by said body, and means for causing the body to advance toward the work at a low, uniform speed, upon the application of longitudinal thrust to the body, during heating and fusion of the fastener, and means for subsequently causing the body to accelerate as a result of said thrust, to drive the fastener against the support and weld it thereto.

19. Apparatus for welding to a support fasteners extending through a member to be secured to said support comprising a body, work-engaging means movably mounted on said body, and means on said body for limiting the speed of movement of the body toward said means when the latter is in engagement with the work and the former is subjected to longitudinal thrust, to provide heating and gradual fusion of the fastener preparatory to welding.

20. The apparatus defined by claim 19 characterized by said speed-limiting means being effective only in the initial period of said movement, whereby the body is finally accelerated by said thrust and drives the fastener against the support to weld it thereto.

21. The apparatus defined by claim 19 characterized by means for finally applying an impact blow to the fastener to cause it to engage said member tightly.

22. The apparatus defined by claim 16 characterized by means for finally applying an impact blow to said fastener-engaging means whereby to cause the fastener to hold the member tightly against the support.

GEORGE HOGG.
JOHN W. FREE.
GEORGE R. CARROLL.